United States Patent [19]
Abbott et al.

[11] Patent Number: 5,809,962
[45] Date of Patent: Sep. 22, 1998

[54] METHOD FOR PRODUCING A PISTON FOR AN INTERNAL COMBUSTION ENGINE AND A PISTON PRODUCED BY THE METHOD

[75] Inventors: Keith Abbott; Daniel Deane; John Renshaw, all of Cambridgeshire, United Kingdom

[73] Assignee: Perkins Limited, Cambridgeshire, United Kingdom

[21] Appl. No.: 819,691

[22] Filed: Mar. 17, 1997

[30] Foreign Application Priority Data

Mar. 20, 1996 [GB] United Kingdom .................... 9605838

[51] Int. Cl.$^6$ ...................................................... F02F 75/06
[52] U.S. Cl. ...................... 123/193.6; 123/276; 123/279; 92/213; 29/888.04; 29/888.042
[58] Field of Search ............................... 92/176, 213, 222, 92/224, 228, 231, 260, 128; 123/193.6, 279, 276; 29/888.04, 888.042

[56] References Cited

U.S. PATENT DOCUMENTS

| 2,662,510 | 12/1953 | French ...................................... 123/279 |
| 5,121,722 | 6/1992 | Horiuchi ................................... 123/276 |
| 5,645,028 | 7/1997 | Matsuoka et al. ....................... 123/276 |

FOREIGN PATENT DOCUMENTS

| 1244814 | 9/1960 | France ...................................... 123/276 |
| 2136594 | 7/1971 | Germany . | |
| 3720865 | 1/1989 | Germany ................................ 123/279 |
| 53-143807 | 12/1978 | Japan ....................................... 123/276 |
| 5-141247 | 6/1993 | Japan ....................................... 123/276 |
| 9101258A | 2/1993 | Netherlands . | |
| 315377 | 10/1929 | United Kingdom ................... 123/279 |
| 2184485 | 6/1987 | United Kingdom . | |

*Primary Examiner*—Thomas E. Denion
*Attorney, Agent, or Firm*—Nilles & Nilles, S.C.

[57] ABSTRACT

A piston for an internal combustion engine includes an insert defining an air chamber opening into the combustion chamber. The insert is preformed to a desired configuration and the piston cast around the insert thus securing the insert within the structure of the piston. The insert may be located wholly within the piston or may have a flange part which extends over an outer surface of the piston.

23 Claims, 3 Drawing Sheets

METHOD FOR PRODUCING A PISTON FOR AN INTERNAL COMBUSTION ENGINE AND A PISTON PRODUCED BY THE METHOD

BACKGROUND OF THE INVENTION

1. Field of the Invention

The present invention relates to a method for producing a piston for an internal combustion (i.c.) engine and a piston produced by the method. In particular, the invention relates to a method for producing a piston of the type having a bowl-in-piston combustion chamber and an air chamber opening into the combustion chamber, the air chamber comprising an insert retained in the piston.

It is known in a direct injection diesel engine to store a portion of hot compressed air from a compression stroke in an air chamber situated within a piston crown and to release this air into the piston combustion chamber during fuel combustion. This restricts oxygen supply for combustion during the early stages of combustion to limit noise and nitrous oxide emissions but increases oxygen supply towards the end of the combustion event when oxygen shortage would otherwise result in incomplete combustion and, therefore, the production of particulates.

2. Discussion of the Related Art

This technique is illustrated by SAE paper 952359, published October 1995, pages 147 to 158, in an article entitled "Modelling the Use of Air Injection for Emissions Reduction in a Direct Injected Diesel Engine", which describes the modelling of air injection for emissions reduction in direct injection diesel engines and compares the results for different air chamber configurations. It is concluded in the paper that the provision of an air chamber in a piston which releases air to the combustion chamber during fuel combustion reduces NOx, noise and particulate emissions. It is further concluded in the paper that an air chamber located below the piston combustion chamber having a certain configuration of transfer holes connecting the combustion chamber and the air chamber gives superior results to alternative geometries. However, the mechanical difficulties of providing an air chamber, or an insert comprising an air chamber, adjacent to a combustion chamber in a piston are not addressed.

Similarly, GB 2184485A discloses a number of alternative constructions of air chamber inserts locatable within a crown of a piston adjacent to a combustion chamber but it does not teach a method of retaining such inserts in the piston crown.

Such inserts are notoriously difficult to retain in place, the piston material being typically an aluminium alloy having a high coefficient of expansion and the piston, in use, being subjected to large temperature and pressure fluctuations.

NL 9101258A does describe a method of retaining an insert in a piston crown. The insert is located within the piston crown generally below a piston combustion chamber and encloses an air chamber. One or more small holes in a wall of the insert connects the air chamber with the combustion chamber. Air is taken into and expelled from the air chamber in a manner similar to that of the present invention. The insert is provided with a flange contiguous with a face of the piston crown and is retained in position by bolts. The bolts may extend from the insert down into a cooler portion of the piston and this results in an increase in the mass of a lower part of the piston which affects piston reciprocation. The bolts also weaken the piston structure. Alternatively, the insert does not have a flange but is retained in the piston crown by freeze fitting. Both of these methods do not provide the integrity of assembly necessary to withstand the stresses that the piston will experience in use.

The prior art mentioned above does not disclose a suitable method for locating and retaining an air chamber insert in a crown of a piston.

DE 2136594, however, describes a method of retaining a metal alloy insert in a crown of a piston. The alloy of the insert is preferably a copper alloy. The insert locates around the mouth of the piston combustion chamber. The purpose of the insert is to reinforce a rim portion of the combustion chamber and protect it from the thermal stresses associated with fuel combustion. The insert is located as an integral part of the piston by casting the piston around the insert. During casting, the insert becomes welded to the material of the piston. The insert has a portion which projects beyond the piston crown which must be removed after the piston has been cast. The extending portion of the insert is provided as a means of positioning the insert prior to the piston being cast. A disadvantage of this method of insert placement is that it is only suitable where the top of the insert is to extend to the top surface of the piston crown.

The retention of an apertured air chamber insert within a piston crown presents additional difficulties to those encountered in retaining combustion chamber lip reinforcing inserts. The air chamber insert is likely to be manufactured from a material dissimilar to that of the body of the piston which will present a problem relating to the difference in thermal expansion of the different materials. A further difficulty that will be encountered, in the case where the insert does not extend to the top surface of the piston crown, is the need to accurately position the insert relative to the piston die or mould.

OBJECTS AND SUMMARY OF THE INVENTION

It is an object of the present invention to provide a method for producing a piston for an internal combustion engine of the type having a bowl-in-piston combustion chamber and an air chamber opening thereinto, the air chamber comprising an insert retained in the piston crown.

According to one aspect of the present invention, there is provided a method for producing a piston for an internal combustion (i.c.) engine, comprising the steps of forming an insert; positioning the insert relative to a piston die or mould; and casting the piston in the die or mould. The insert is positioned relative to the piston die or mould such that, when the piston is cast, the insert forms an integral part of the piston so formed, and the insert is formed such that it at least in part defines an air chamber opening into a combustion chamber formed within a crown of the piston.

The method may include positioning the insert relative to the piston die or mould such that, when the piston is cast, a shoulder is formed which projects into the combustion chamber, the shoulder retaining the insert in the piston crown.

The method may include forming the shoulder at or near a mouth of the combustion chamber.

The method may include positioning the insert relative to the piston die or mould such that, when the piston is cast, it is located wholly within the piston crown.

Alternatively, the method includes forming the insert and positioning it relative to the piston die or mould such that, when the piston is cast, a portion thereof extends over an upper surface of the piston crown.

The method may include forming the insert such that a surface portion thereof forms at least a part of a surface comprising a combustion bowl bounding the combustion chamber.

The method may include forming at least one aperture in the insert before casting the piston, the aperture intended to afford communication between the air chamber and the combustion chamber.

Alternatively, the method may include forming the at least one aperture in the insert after the piston has been cast.

The method may include forming the at least one aperture in the insert such that it opens on the surface portion thereof which forms at least a part of the combustion bowl.

The method may include positioning the insert relative to the piston die or mould by means of a core of material which, once the piston has been cast, can be easily removed from the insert.

The method may include contacting the core of material with the insert on the surface portion thereof which forms at least a part of the combustion bowl.

The method may include attaching the insert to the core of material by placing the insert onto an end portion of the core such that the material of the core conforms to the shape of the surface portion of the insert to which it is attached.

According to another aspect of the invention, there is provided a piston for an i.c. engine comprising a piston body; a combustion bowl defining a combustion chamber formed in a crown of the piston body; and an air chamber opening into the combustion chamber. The air chamber is bounded by an insert retained in the piston crown. The insert has at least one aperture affording communication between the air chamber and the combustion chamber. The piston is cast such that it is integral with the insert.

The insert may be retained in the piston crown by a cast shoulder projecting into the combustion chamber.

The shoulder may be located at or near a mouth of the combustion chamber.

The insert may be located wholly within the piston crown.

Alternatively, the insert has a flange portion which extends over an upper surface of the piston crown.

The flange portion may include an outer ring portion which extends downwardly to enclose a rim portion of the piston crown.

The flange portion of the insert may be shaped such that it forms a dovetail type joint arrangement with the rim portion of the piston crown.

An edge of the ring portion of the flange portion may comprise at least a top piston ring groove.

The insert may be shaped and positioned within the piston crown such that the air chamber is situated over a connecting rod small end bearing of the piston.

The insert may be shaped such that the air chamber locates below the combustion chamber.

The insert may be shaped such that the air chamber is located centrally with respect to the combustion chamber.

The insert may be shaped such that an upper surface thereof defines a lower portion of the combustion bowl.

The insert may include a base wall which, in use, provides a bridge over the connecting rod small end bearing of the piston.

The insert may be formed from a thermally insulating material such as ceramic.

Alternatively, the insert may be formed from a ferrous, copper or other metal alloy.

The insert may be round in plan.

The upper surface of the insert forming a bottom portion of the combustion bowl may be shaped so as to enhance swirl of air exiting the air chamber.

BRIEF DESCRIPTION OF THE DRAWINGS

The foregoing and further features of the present invention will be more readily understood from the following description of preferred embodiments, by way of example thereof, with reference to the accompanying drawings of which.

DESCRIPTION OF THE PREFERRED EMBODIMENT

Figure 1:
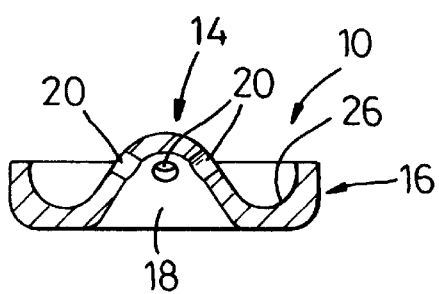
FIG. 1 is a cross-sectional elevation view of a piston air chamber insert in accordance with a first embodiment of the invention.
Figure 2:
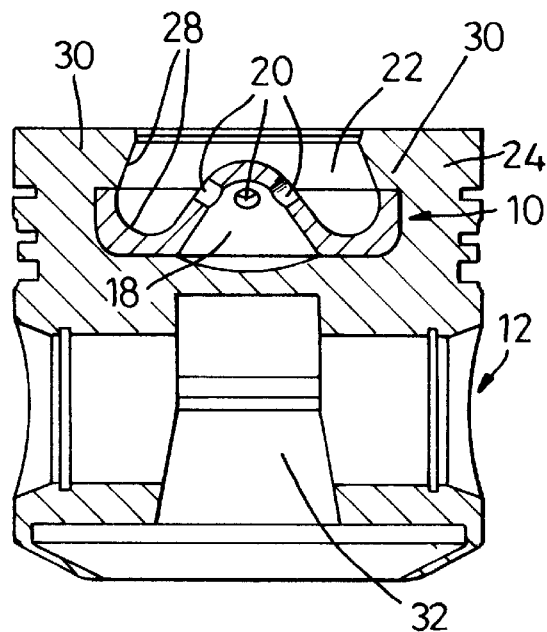
FIG. 2 is a cross-sectional elevation view of a piston incorporating the insert of FIG. 1.
Figure 3:
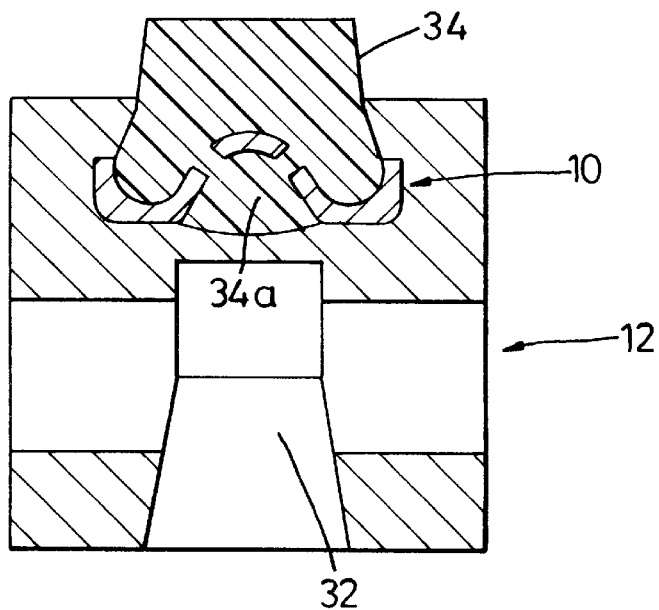
FIG. 3 is a cross-sectional elevation view of the insert of FIG. 1 located in a piston, the insert being carried on a core of material for holding said insert in position relative to a piston die or mould thus illustrating the method of the invention.

Reference will first be made to FIGS. 1 to 3 of the drawings. FIG. 1 is a cross-sectional elevation of a piston air chamber insert 10 to be located within the body of a piston 12 (FIG. 2). The insert 10 is generally round in plan and comprises a central domed portion 14 surrounded by an upturned flange portion 16. The central domed portion 14 generally encloses an air chamber 18 although, in use, a base of the air chamber 18 will comprise a part of a piston 12 to be cast in situ around the insert 10. The domed portion 14 has a number of apertures 20 located radially around a central axis thereof. In use, the apertures 20 afford communication between the air chamber 18 and a combustion chamber 22 formed in a crown 24 of the piston 12. An upper surface 26 of the insert 10 comprises, in use, a part of a combustion bowl 28 bounding the combustion chamber 22 formed in the piston crown 24.

The air chamber 18 communicates with the combustion chamber 22 via the apertures 20 which allow compressed air to pass into the chamber 18 during a piston compression stroke. The air in the chamber 18 is released to the combustion chamber 22 during fuel combustion on the engine expansion stroke. In this way the amount of air, and thus oxygen, for fuel combustion is desirably restricted during the early stages of fuel combustion but augmented during the later stages of combustion.

The insert 10 is retained in the piston crown 24 by means of casting the piston 12 around the insert 10 such that the insert 10 forms an integral part of the piston 12. The insert 10 is retained in place by a cast shoulder 30 which projects into the combustion chamber 22 over the upturned flange part 16 of the insert 10. The insert is wholly contained within the piston crown 24. With the particular arrangement of the first embodiment, an advantage exists in that the air chamber 18 locates generally over a connecting rod small end bearing 32. This provides a degree of thermal insulation to protect the bearing 32 from the high temperatures occurring during fuel combustion. This reduces, and may even eliminate, the need for piston cooling means, such as oil jet cooling, to be included in the i.c. engine.

The insert 10 may be formed from a metal alloy or ceramic. The material of the insert may diffusion bond with the metal of the piston on its being cast, thus retaining the insert in place. It may not therefore be necessary to cast a shoulder 30 in the piston crown.

The insert may be formed by the investment casting process or by any other suitable process which may be dictated by the material of the insert. The material of the insert may be chosen to have a lower coefficient of thermal expansion than the alloy of the piston body. The insert will thermally insulate the lower piston body from combustion heat and thus the expansion of the insert itself will be closer to that of the lower part of the piston crown than would be the case if some thermal protection was not provided by the insert.

FIG. 3 illustrates the method of positioning the insert with respect to a piston die or mould (not shown) prior to casting the piston (which is shown as cast). The insert 10 is positioned by carrying it on a core 34 of material which, in use, forms part of the piston die or mould. The insert is placed onto an end of the core such that the material of the core end conforms to the upper surface 26 of the insert. The remaining surface of the core 34 may be suitably shaped in readiness for piston casting such that the surface can determine part of the combustion chamber shape and reduce, if not eliminate, subsequent machining of the combustion bowl 28.

In placing the insert 10 on the core 34 of the material, it is necessary to locate some core material 34a in the base of the insert to define the air chamber 18. This core material 34a can be removed from the air chamber 18 via the apertures 20 which may be formed during subsequent machining of the piston crown 24 after the casting process. The material of the core may be any material suitable for casting and which can be easily cleaned from the piston and insert after casting. The material may be a leachable material such as salt which solidifies upon heating but can be dissolved and washed away with water upon completion of the casting process.

Figure 4:
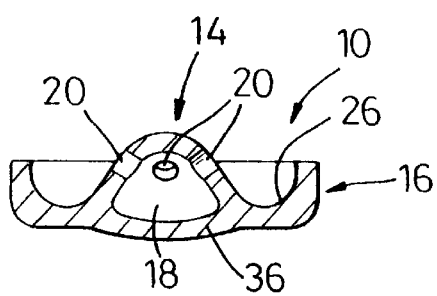
FIG. 4 is a cross-sectional elevation view of a piston air chamber insert in accordance with a second embodiment of the invention.
Figure 5:
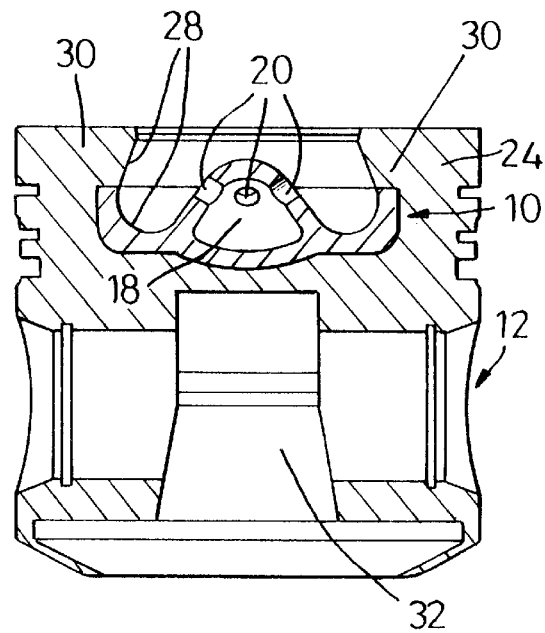
FIG. 5 is a cross-sectional elevation view of a piston incorporating the insert of FIG. 4.
Figure 6:
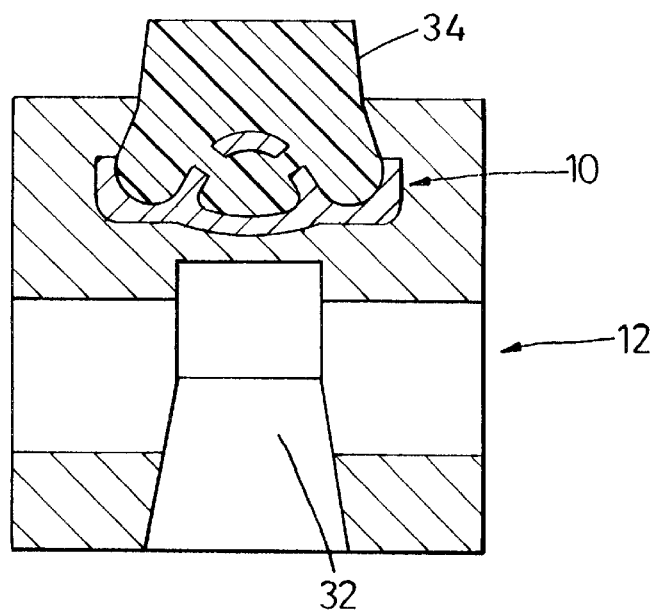
FIG. 6 is a cross-sectional elevation view of the insert of FIG. 4 located in a piston the insert being carried on a core of material holding said insert in position relative to a piston die or mould thus illustrating the method of the invention.

FIGS. 4 to 6 illustrate a second embodiment of the insert. Like numerals are used to denote like parts. The insert 10 is generally identical to that of the first embodiment but includes a base wall 36 to enclose the air chamber 18. The base wall 36 comprises a bridge over the connecting rod small end bearing 32 to strengthen the base of the piston crown 24 and reduce the thickness of piston material at this point. Thus, the piston 12 so formed is of a similar weight to a conventional piston, but equally as strong.

When placing the insert 10 on the core 34 for positioning it with respect to the piston die or mould, it is necessary to ensure that the material of the core closes over any apertures 20 in the upper wall of the insert if these have already been formed. Any core material which extends into the air chamber 18 can be easily removed after casting.

Figure 7:
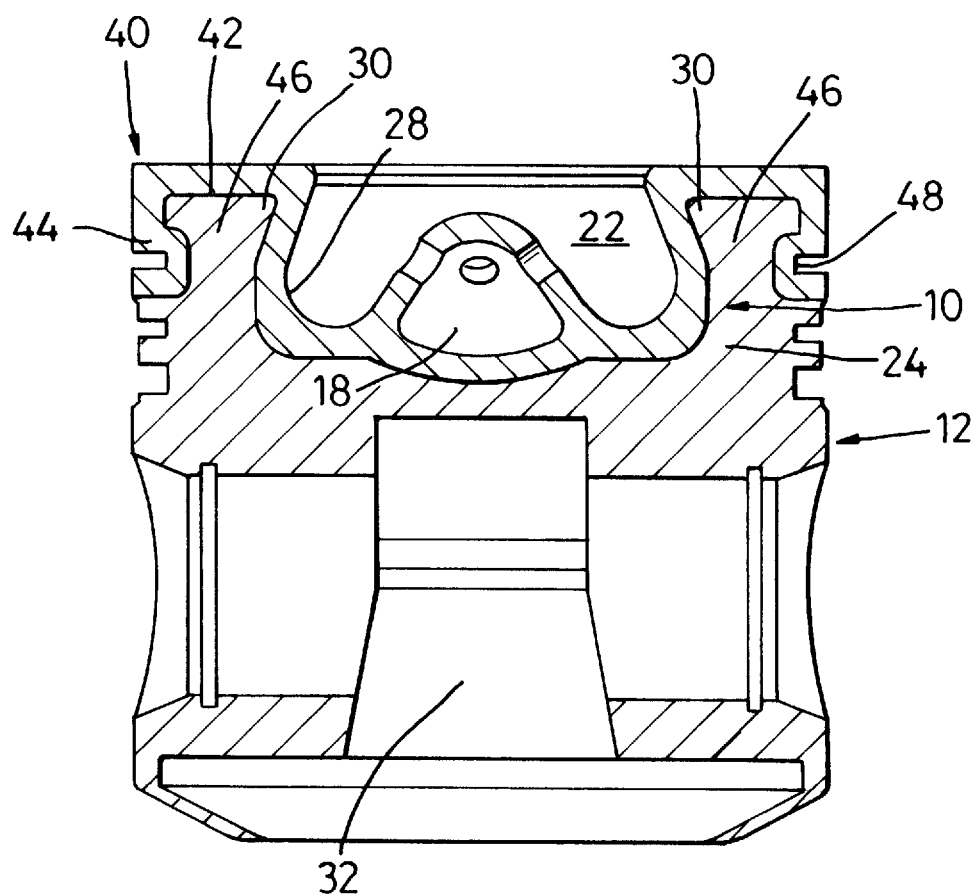
FIG. 7 is a cross-sectional elevation view of a piston incorporating a piston air chamber insert in accordance with a third embodiment of the invention.

FIG. 7 illustrates a third embodiment of the insert which includes an outer flange portion 40 which extends over a top surface 42 of the piston crown 24. The outer flange portion 40 includes an outer ring portion 44 which encloses a rim portion 46 of the piston crown 24. The outer flange portion 40 is shaped so as to form a dovetail type joint with the rim portion 46 of the piston crown 24 but an inner edge of said rim portion also comprises a shoulder 30 for retaining the insert 10 to the piston 12. Other features of the insert are generally identical to those of the second embodiment. The outer ring portion 44 extends around the piston crown 24 and comprises an upper piston ring groove 48 in the piston crown 24.

It will be seen that, with an insert configured in the manner illustrated in the embodiments, the air chamber is located centrally to and below the combustion chamber of the piston. It will be appreciated that the insert can be configured to provide other arrangements of air chamber with respect to combustion chamber.

We claim:

1. A method for producing a piston for an internal combustion (i.c.) engine, comprising the steps of: forming an insert, positioning the insert relative to a piston die or mould; and casting the piston in the die or mould; wherein the insert is positioned relative to the piston die or mould such that, when the piston is cast, the insert forms an integral part of the piston, and the insert is formed such that the piston at least in part defines an air chamber opening, via at least one aperture, into a combustion chamber bounded by a combustion bowl formed within a piston crown of the piston, the combustion chamber having a raised portion surrounded by a recessed portion, the insert comprising, in one piece, a raised portion and a lower portion, the raised portion of the insert forming a part of the combustion bowl which includes the aperture and which defines at least in part the air chamber, the lower portion of the insert extending downwardly and outwardly away from the raised portion of the insert so as to form a further part of the combustion bowl and further extending at least to a side wall of the combustion chamber so as to define a flange portion, and wherein the method includes positioning the insert relative to the piston die or mould such that, when the piston is cast, a shoulder is formed which projects over the flange portion, the shoulder retaining the insert in the piston crown.

2. A method as claimed in claim 1, wherein the shoulder projects inwardly towards the combustion chamber, the shoulder retaining the insert in the piston crown.

3. A method as claimed in claim 1, wherein the shoulder is formed at a mouth of the combustion chamber.

4. A method as claimed in claim 1, wherein the insert is positioned relative to the piston die or mould such that, when the piston is cast, it is located wholly within the piston crown.

5. A method as claimed in claim 1, wherein the insert is formed and positioned relative to the piton die or mould such that, when the piston is cast, a portion thereof extends over an upper surface of the piston crown.

6. A method as claimed in claim 1, wherein at least one aperture is formed in the insert before casting the piston, the aperture affording communication between the air chamber and the combustion chamber after casting the piston.

7. A method as claimed in claim 1, wherein the at least one aperture is formed in the insert after the piston has been cast.

8. A method as claimed in claim 1, wherein the insert is positioned relative to the piston die or mould by means of a core of material which, once the piston has been cast, can be easily removed from the insert.

9. A method as claimed in claim 8, wherein the core of material contacts the insert on a surface portion thereof which forms at least a part of the combustion bowl.

10. A method as claimed in claim 8, wherein the insert is attached to the core of material by placing said insert onto an end portion of said core such that a material of the core of material conforms to the shape of the surface portion of the insert to which it is attached.

11. A piston for an internal combustion engine, comprising: a piston body; a combustion bowl defining a combustion chamber 1) formed in a piston crown of the piston body, and 2) having a raised portion surrounded by a recessed portion; and an air chamber opening into the combustion chamber, the air chamber being bounded at least in part by an insert retained in the piston crown, the insert having at least one aperture affording communication between the air chamber and the combustion chamber, the insert comprising, in one piece, 1) a raised portion including the aperture and defining the air chamber, and 2) a lower portion extending downwardly and outwardly away from the raised portion of the insert so as to form at least a part of the combustion bowl, the lower portion of the insert further extending at least to a side wall of the combustion bowl so as to define a flange portion, and wherein the piston is cast such that it is integral with the insert, and a shoulder is formed which projects overs the flange portion, the shoulder retaining the insert in the piston crown.

12. A piston as claimed in claim 11, wherein the shoulder projects into the combustion chamber.

13. A piston as claimed in claim 11, wherein the shoulder is located at a mouth of the combustion chamber.

14. A piston as claimed in claim 11, wherein the insert is located wholly within the piston crown.

15. A piston as claimed in claim 11, wherein the insert has a flange portion which extends over an upper surface of the piston crown.

16. A piston as claimed in claim 15, wherein the flange portion includes an outer ring portion which extends downwardly to enclose a rim portion of the piston crown.

17. A piston as claimed in claim 16, wherein the flange portion of the insert is shaped such that it forms a dovetail type joint arrangement with the rim portion of the piston crown.

18. A piston as claimed in claim 16, wherein an edge of the ring portion of the flange portion comprises at least a top piston ring groove.

19. A piston as claimed in claim 11, wherein the insert is shaped and positioned within the piston crown such that, in use, the air chamber is situated over a connecting rod small end bearing of the piston.

20. A piston as claimed in claim 19, wherein the insert includes a base wall which, in use, provides a bridge over the connecting rod small end bearing of the piston.

21. A piston for an internal combustion engine, comprising: a piston body; a combustion bowl defining a torroidal bowl combustion chamber formed in a piston crown of the piston body; an insert retained in the piston crown; and an air chamber opening into the combustion chamber, the air chamber being bounded at least in part by the insert, wherein the piston is cast such that the piston is integral with the insert, wherein the insert has a flange portion which extends over an upper surface of the piston crown, and wherein the flange portion includes an outer ring portion which extends downwardly to enclose a rim portion of the piston crown.

22. A piston as claimed in claim 21, wherein the flange portion of the insert is shaped such that it forms a dovetail-type joint arrangement with the rim portion of the piston crown.

23. A piston as claimed in claim 22, wherein an edge of the ring portion of the flange portion comprises at least a top piston ring groove.

* * * * *